United States Patent [19]

Yamadera et al.

[11] Patent Number: 5,001,454
[45] Date of Patent: Mar. 19, 1991

[54] THIN FILM RESISTOR FOR STRAIN GAUGE

[75] Inventors: Hideya Yamadera; Yoshiki Seno; Yasunori Taga; Katsuhiko Ariga; Tadashi Ozaki, all of Aichi; Naoki Hara, Mie; Haruhiko Inoue, Aichi, all of Japan

[73] Assignees: Kabushiki Kaisha Toyota Chuo Kenkyusho, Aichi; Nippondenso Co., Ltd., Kariya, both of Japan

[21] Appl. No.: 404,209

[22] Filed: Sep. 7, 1989

[30] Foreign Application Priority Data

Sep. 12, 1988 [JP] Japan .................................. 63-227740
Dec. 2, 1988 [JP] Japan .................................. 63-306318

[51] Int. Cl.$^5$ .......................... H01C 1/012; G01L 1/22
[52] U.S. Cl. .......................................... 338/308; 338/2
[58] Field of Search ................................ 338/2–5, 338/306, 307, 308, 309, 314; 437/921; 73/862.65

[56] References Cited

U.S. PATENT DOCUMENTS 4,151,502  4/1979  Kurihara et al. .................. 338/2
4,462,018  7/1984  Yang et al. ....................... 338/3
4,786,887  11/1988  Bringmann et al. ............... 338/2

FOREIGN PATENT DOCUMENTS 61-256233  11/1986  Japan .

Primary Examiner—Bruce A. Reynolds
Assistant Examiner—Marvin M. Lateef
Attorney, Agent, or Firm—Oblon, Spivak, McClelland, Maier & Neustadt

[57] ABSTRACT

A thin film resistor for a strain gauge prepared by physical or chemical vapor deposition. The resistor contains 60 to 98 atomic % of chromium, 2 to 30 atomic % of oxygen, and 0 to 10 atomic % of a metal or semiconductor. These constituents are uniformly distributed. The thickness of the film is between 0.01 and 10 $\mu$m. The metal is at least one of Al, Ti, Ta, Zr and In, and the semiconductor is at least one of silicon, germanium and boron. The thin film resistor has excellent resistance-strain characteristics and resistance-temperature characteristics, as well as high sensitivity and mechanical strength.

6 Claims, 2 Drawing Sheets ns5,001,454

THIN FILM RESISTOR FOR STRAIN GAUGE

FIELD OF THE INVENTION

The present invention relates to a thin film resistor for a strain gauge which utilizes a change in the electrical resistance caused by strain.

RELATED ART STATEMENT

Heretofore, two kinds of thin film resistors for strain gauges have generally been used. One makes use of changes in resistance of metals or alloys which are caused by strains. The other utilizes piezoresistive effect of a semiconductor (see "Sensor Techniques", vol. 5, No. 7, 49, Japan, 1985). The former thin film resistor such as nickel (Ni)-chromium (Cr) alloy has a low temperature coefficient of resistance. Therefore, the output varies only a little with temperature. Further, the linearity of the resistance-strain characteristics is excellent. However, the fractional change in resistance to strain, i.e., the gauge factor, is small. Therefore, the former has a small gauge factor and so the signal-to-noise ratio of the strain gauge is low. Hence, a high-sensitivity amplifier is needed. This makes it difficult to miniaturize the strain gauge. On the other hand, the latter such as silicon has a large gauge factor but its temperature coefficient of resistance is high. Further, the linearity of the resistance-strain characteristics is poor. Consequently, the latter necessitates an amplifier and temperature-compensating circuit to improve the linearity of the output from the strain gauge. This complicates the control system. In addition, the latter has a lower rupture strength than the former and hence is unsuited for a strain gauge for high pressure.

That is, there have been no thin film resistors which are for use with strain gauges and have high sensitivity and excellent mechanical strength. Especially, it has been considered that it is difficult to develop thin film resistors which are for use with strain gauges, have high sensitivity, and are excellent in resistance-strain characteristics, resistance-temperature characteristics, and mechanical strength.

SUMMARY OF THE INVENTION

In view of the foregoing circumstances, the present inventors have attempted to solve the above-described problems and found that a thin film formed from Cr, oxygen, and a metal such as aluminum or a semiconductor such as silicon by sputter deposition exhibits an unparalleled gauge factor (K=5 to 10). When such a thin film is made from an ordinary metal or alloy, the gauge factor is between 1.5 and 3. Accordingly, it has been concluded that a high-sensitivity strain gauge is made from a thin film resistor including Cr, oxygen, and a metal or a semiconductor.

It is an object of the invention to provide a thin film resistor for use with a strain gauge, which has high sensitivity and is excellent in mechanical strength.

It is another object of the invention to provide a thin film resistor for use with a strain gauge, which is excellent in resistance-strain characteristics and resistance-temperature characteristics.

The novel thin film resistor for a strain gauge is prepared by physical vapor deposition or chemical vapor deposition and contains 60 to 98 atomic % of Cr, 2 to 30 atomic % of oxygen, and 0 to 10 atomic % of a metal or semiconductor. These constituents are uniformly distributed. The film thickness is 0.01 to 10 μm.

In one feature of the invention, the thin film resistor shows a large gauge factor exceeding 5, which is larger than that of a conventional strain gauge made from a metal or alloy. The property of strain-resistance has better linearity than the linearities of semiconductor strain gauges of Si or the like. Also, the temperature coefficient of resistance is as low as less than ±100 ppm °C. Furthermore, after the resistor is kept at a temperature of about 120 ° C. for a long time, the fractional change in resistance hardly varies. In this way, the resistor is highly stable to high temperatures. Additionally, the strength is close to those of the prior art metallic resistors and much higher than those of semiconductor resistors of Si or the like. The reason why the novel thin film resistor exhibits such excellent properties is not fully understood but may be explained below. The oxygen and metal or semiconductor act as scatterers which impede flow of conduction electrons of Cr and control the mean free path of the conduction electrons of Cr. The addition of the metal such as Al or the semiconductor such as Si makes the structure quite fine. The chromium and the added element are mixed together uniformly. We presume that this provides the stability to high temperatures.

Accordingly, a pressure sensor or load cell which has a large gauge factor and is stable to high temperatures can be fabricated from the novel thin film resistor.

DETAILED DESCRIPTION OF THE INVENTION

A thin film resistor for use with a strain gauge and in accordance with the invention contains 60 to 98 atomic % of Cr, and 2 to 30 atomic % of oxygen. Outside these ranges, it is difficult to obtain large gauge factors. Preferably, the oxygen content is 15% to 25%. The metal included in the resistor is at least one selected from Al, Ti, Ta, Zr, In and Mo.

The semiconductor included in the resistor is at least one selected from silicon, germanium and boron. Preferably, the metal or semiconductor content is 0 to 10 atomic % to maintain a large gauge factor and to obtain good resistance-strain characteristics and good resistance-temperature characteristics. To obtain the good properties, Cr, oxygen, and the metal or semiconductor must be substantially homogeneously distributed, at least of the order of microns.

Preferably, the film thickness is in excess of 0.01 μm to constitute a continuous film and to obtain stable resistance-strain characteristics. Also, to prevent the film from becoming destroyed by internal stress, the thickness is preferably less than 10 μm. Considering both control over the film thickness and film characteristics, the thickness of 0.1 to 1 μm is especially preferable.

The novel thin film resistor can be prepared by ion plating, sputtering, evaporation, plasma-assisted CVD, or other physical vapor deposition, or chemical vapor deposition (CVD) all of which usually are used to prepare thin film resistors. To derive dense and homogeneous mixture of Cr, oxygen, and a metal or semiconductor, sputtering or evaporation is desired. In order to promote the homogeneity of this mixture, the thin film may be heated to a temperature of 200° C. to 500° C. for 1 to 2 hours after the film is formed. To introduce oxygen into the thin film resistor, the atmosphere in which sputtering process or the like is carried out must contain oxygen.

The film characteristics are especially excellent when the oxygen content is 15 to 25 atomic %. It is necessary, however, to intentionally add oxygen to the atmosphere that contains a certain amount of oxygen as an impurity, to include more than 15 atomic % oxygen in the film.

Where the atmosphere contains no oxygen, less than 30 atomic % oxygen can be included in the thin film by sputtering a metal oxide such as $Al_2O_3$ or $TiO_2$, or $SiO_2$.

EXAMPLE 1

Figure 1:
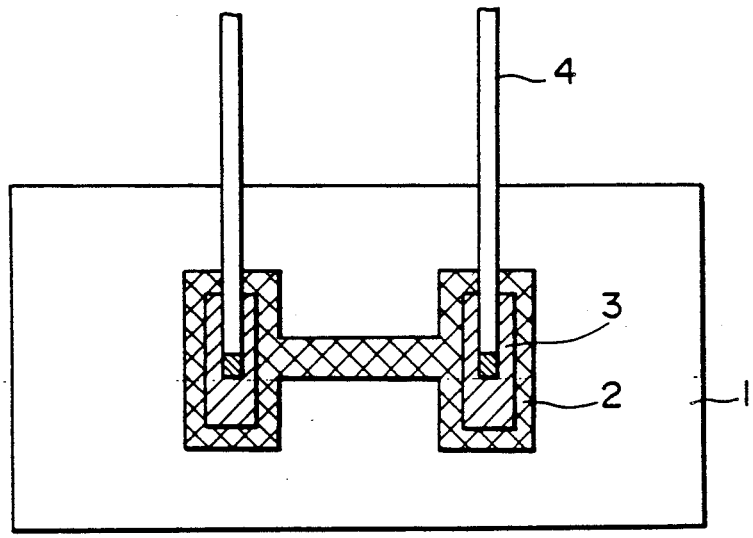
FIG. 1 is a plan view of a strain gauge for use with a thin film resistor according to the Example of the invention.
Figure 2:
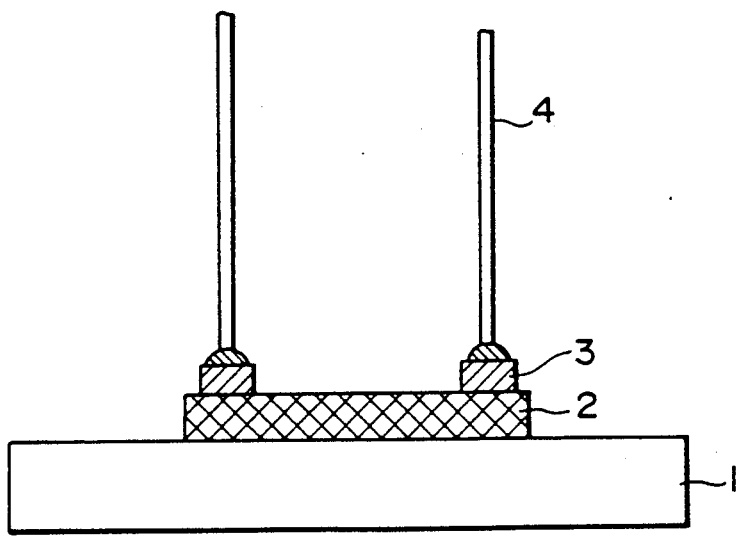
FIG. 2 is view of the strain gauge shown in FIG. 1.

Referring to FIG. 1, there is shown a strain gauge according to the invention. A thin film resistor was prepared by co-sputtering. First, a substrate 1 of Corning 0313 glass was cleaned with boiling trichloroethylene and ultrasonically cleaned with acetone. After dried, the substrate was placed in a sputtering apparatus, and a stainless steel mask for a strain gauge was attached to the substrate. The inside of the apparatus was evacuated to $5 \times 10^{-6}$ torr. Then, Ar gas was admitted into the apparatus until a pressure of $5 \times 10^{-3}$ torr was reached. Electric power of DC 300 W was applied to a target of Cr, and electric power of RF 150 W of 13.56 MHz was applied to a target of $Al_2O_3$. These materials were sputtered for 6 minutes. In this way, a strain gauge film 2 that was a resistor was fabricated. The composition of the film 2 was investigated by EPMA and XPS (x-ray photoelectron spectroscopy). The thickness was measured with a surface profiler. The strain gauge film contained Cr, 21 atomic % of oxygen (O), and 4 atomic % of aluminum (Al) (sample No. 1). The film thickness was 0.20 μm (see the Table). The substrate on which the strain gauge film was formed was taken into the air and then a mask for electrodes was mounted with it. Thereafter, electric power of DC 250 W was applied to a target of Au in the same way as in the above-described process, to sputter Au for 1 minute, for creating an electrode film 3 of Au of 0.1 μm thick. Then, the specimen was heated at 300° C. for 1 hour in the air. Thereafter, lead wires 4 were soldered to the Au electrodes. The characteristics of the strain gauge prepared in this way were evaluated.

Figure 3:
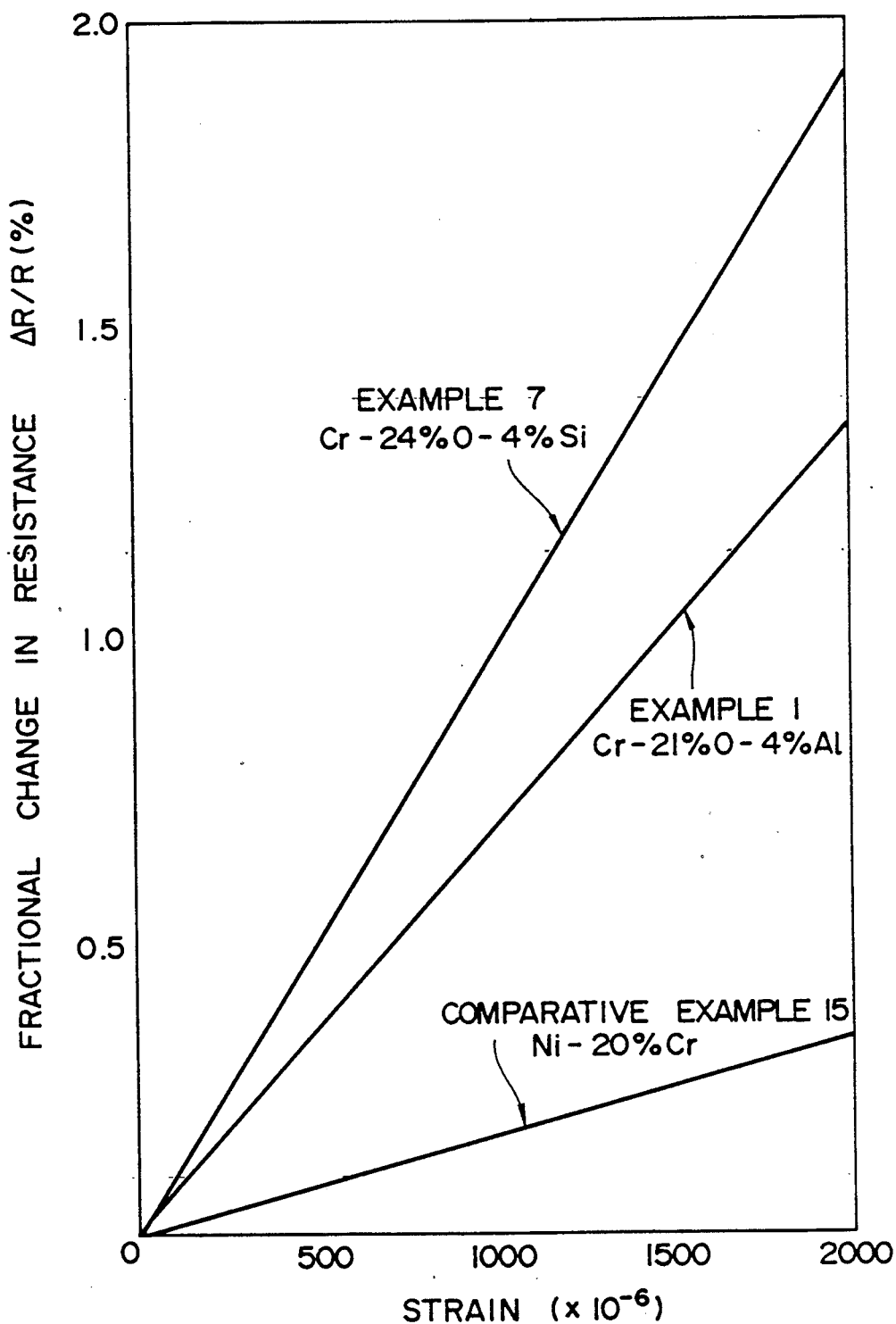
FIG. 3 is a in which the fractional change in resistance is against strain for Examples 1,7 and for Comparative Example 15.

These characteristics included the resistance-strain characteristics, the resistance-temperature characteristics, and temperature coefficient of sensitivity. Also, an aging test was conducted. FIG. 3 shows the relation of the fractional change in resistance of the novel strain gauge to the strain. The gauge factor K was found from the inclination of the straight line describing the relation of the fractional change in resistance to the strain. The temperature was changed from −30° C. to 120° C. to measure the temperature coefficient of resistance (TCR) (in ppm/°C). The temperature coefficient of sensitivity (TCS) is given by $$TCS = \Delta K / \Delta T$$

where K is the gauge factor, and T is temperature. In the present example, the gauge factor was measured at room temperature of 25° C. and at 120° C. Then, the difference between the two gauge factors was calculated. Also, the difference between the temperatures was calculated. The temperature coefficient of sensitivity was computed from the equation $$TCS = \frac{K_{T=120° C.} - K_{T=25° C.}}{120° C. - 25° C.}$$

The aging test was performed by allowing the strain gauge to stand at 120° C. for 500 hours and then measuring the fractional change in resistance ΔR (%). The results of the evaluation are shown in the Table.

EXAMPLES 2-6

Strain gauge films were formed in the same way as in Example 1, but the proportions of oxygen and Al were varied. The compositions and the film thickness of the gauges are shown in the Table. Then, electrodes and lead wires were attached in the same manner as in Example 1. The gauges were evaluated in the same manner as in Example 1. The results of the evaluation are shown in the Table.

EXAMPLES 7-10

Resistors were made from silicon semiconductor. Sputtering conditions were similar to those of Example 1 except that a target of SiO was used. The thicknesses of the films were 0.17 to 0.20 μm. The film of Example 7 contained Cr, 24 atomic % of O, and 4 atomic % of Si. The film of Example 8 contained Cr, 8 atomic % of O, and 1 atomic % of Si. The film of Example 9 contained Cr, 19 atomic % of O, and 1 atomic % of Si. The film of Example 10 contained Cr, 15 atomic % of O, and 4 atomic % of Si. Electrodes and lead wires were attached to the films in the same way as in Example 1. The properties of the film were evaluated. The results are listed in the Table. The fractional change in resistance-strain characteristics of the film of Example 7 are shown in FIG. 3.

COMPARATIVE EXAMPLES 11-16

A thin film resistor (Example 11) containing Cr, 18 atomic % of O, and 13 atomic % of Al was formed by co-sputtering in the same manner as in Examples 1, 7-10. Also, a resistor (Example 12) containing Cr, 26 atomic % of O, and 11 atomic % of Al was created. A resistor (Example 13) containing Cr, 26 atomic % of O, and 12 atomic % of Si was formed. Further, a resistor (Example 14) containing Cr, 15 atomic % of O, and 13 atomic % of Si was formed. Ni-Cr and Si which have been heretofore used as strain gauge materials were deposited on a glass substrate to form strain gauge films. Their compositions and film thicknesses are shown in the Table. Then, electrodes and lead wires were attached in the same way as in Example 1, to form strain gauges. These gauges were evaluated in the same manner as in Example 1. The results are shown in the Table. The fractional change in resistance-strain characteristics of the Ni-Cr alloy are shown in FIG. 3.

Evaluation

Some of the Examples 1-10 contain Cr and O, and others contain Cr, O, and Al or Si. As can be seen from the Table, the novel strain gauge films have gauge factors 3 to 5.6 times as large as those of the Comparative Example 15 containing Ni-Cr. That is, the strain gauges of the Examples have sensitivities several times as high as that of the prior art metallic resistor type strain gauge. In Comparative Example 14 which departs from the scope of the invention, 13 atomic % of silicon is added to Cr and oxygen. The gauge factors of the novel strain gauge factors are 2 to 3.8 times as high as the gauge factor of Comparative Example 14. In Comparative Example 11, the film contains Cr, oxygen, and 13 atomic % of Al. In Comparative Example 12, the film contains Cr, oxygen, and 11 atomic % of Al. In Comparative Example 13, the film contains Cr, oxygen, and 12 atomic % of Si. The films of these Comparative Examples 11-13 have poor temperature coefficients of resistance. In the novel strain gauges, appropriate amounts of Cr, oxygen, and Al or Si are mixed together, resulting in high gauge factors. The produced thin films exhibit low temperature coefficients of resistance.

As can be seen from the Table, some strain gauges according to the invention comprise Cr and oxygen. Other strain gauges according to the invention comprise Cr, oxygen, and Al or Si. These gauges are superior to the Si strain gauge of the Comparative Example 16 in resistance-temperature characteristic and in stability to high temperatures, for the reasons explained below. Addition of appropriate amounts of oxygen and Al or Si to Cr shortens the mean free path of the conduction electrons of Cr to thereby reduce the temperature coefficient of resistance. Since Cr, oxygen, and Al or Si were mixed together uniformly, when the films were allowed to stand at high temperatures, the thin films were stable. As can be seen from FIG. 3, the novel strain gauges respond very well to strain while keeping their linearity. The temperature coefficients of sensitivity of Examples 1, 3, 4, 9 and 10 are less than ±86 ppm/°C. On the other hand, the strain gauge films of Comparative Examples 11 and 14, and the prior art SiC strain gauge film of Comparative Example 16, departing from the scope of the invention, have temperature coefficients of sensitivity not less than ±196 ppm/°C. Thus, the novel strain gauge films are very excellent in sensitivity-temperature characteristics.

Furthermore, the novel strain gauges of Examples 1-10 are much superior to strain gauges of semiconductors such as Si or boron in strength. The novel strain gauges are comparable in strength to strain gauges of metals or alloys.

TABLE (Results of evaluation)

| Sample No. | Composition | Film thickness (μm) | Gauge factor | TCR (ppm/°C.) | TCS (ppm/°C.) | Fractional change in resistance after left at high temp. (%) |
|---|---|---|---|---|---|---|
| Examples | | | | | | |
| 1 | Cr, 21 at % O, 4 at % Al | 0.20 | 7.3 | −83 | 14 | 0.08 |
| 2 | Cr, 17 at % O, 7 at % Al | 0.22 | 5.3 | 56 | — | 0.06 |
| 3 | Cr, 17 at % O, 9 at % Al | 0.22 | 7.1 | −36 | 86 | 0.06 |
| 4 | Cr, 16 at % O | 0.20 | 7.4 | 84 | 42 | 0.09 |
| 5 | Cr, 23 at % O | 0.21 | 7.0 | −47 | — | 0.08 |
| 6 | Cr, 10 at % O | 0.20 | 8.8 | 75 | — | 0.10 |
| 7 | Cr, 24 at % O, 4 at % Si | 0.17 | 9.5 | −73 | — | 0.03 |
| 8 | Cr, 8 at % O, 1 at % Si | 0.20 | 8.4 | 8 | — | 0.06 |
| 9 | Cr, 19 at % O, 1 at % Si | 0.20 | 8.4 | 8 | −45 | 0.06 |
| 10 | Cr, 15 at % O, 4 at % Si | 0.17 | 9.4 | −98 | 70 | 0.03 |
| Comparative Examples | | | | | | |
| 11 | Cr, 18 at % O, 13 at % Al | 0.20 | 7.5 | −614 | −196 | — |
| 12 | Cr, 26 at % O, 11 at % Al | 0.20 | 6.8 | −417 | — | — |
| 13 | Cr, 26 at % O, 12 at % Si | 0.20 | 4.6 | −125 | — | — |
| 14 | Cr, 15 at % O, 13 at % Si | 0.20 | 2.5 | −78 | −1030 | — |
| 15 | Ni, 20 at % Cr | 0.20 | 1.7 | 20 | 5 | 0.04 |
| 16 | Si | 0.30 | 42.0 | −850 | 450 | 1.40 |

What is claimed is:

1. A thin film resistor for a strain gauge, comprising a thin film formed by physical or chemical vapor deposition, the film containing 60 to 98 atomic % of chromium, 2 to 30 atomic % of oxygen and 0 to 10 atomic % of at least one metal or semiconductor, the chromium, oxygen and metal or semiconductor being uniformly distributed and the thickness of the film being 0.01 to 10 μm.

2. A thin film resistor according to claim 1, wherein said metal is at least one selected from the group consisting of aluminum, titanium, tantalum, zirconium and indium.

3. A thin film resistor according to claim 1, wherein said semiconductor is at least one selected from the group consisting of silicon, germanium and boron.

4. A thin film resistor according to claim 1, wherein said physical vapor deposition is ion plating, sputtering, vapor deposition or plasma-assisted chemical vapor deposition.

5. A thin film resistor according to claim 1, wherein the thickness of the film is 0.1 to 1 μm.

6. The thin film resistor according to claim 1, wherein said metal is at least one select from the group consisting of aluminum, titanium, tantalum, zirconium, indium, and molybdenum.

* * * * *